Sept. 3, 1968    K. O. WIKHOLM    3,400,028
METHOD FOR PRODUCING LEAKPROOF CONTAINERS
Filed Dec. 21, 1965    2 Sheets-Sheet 1
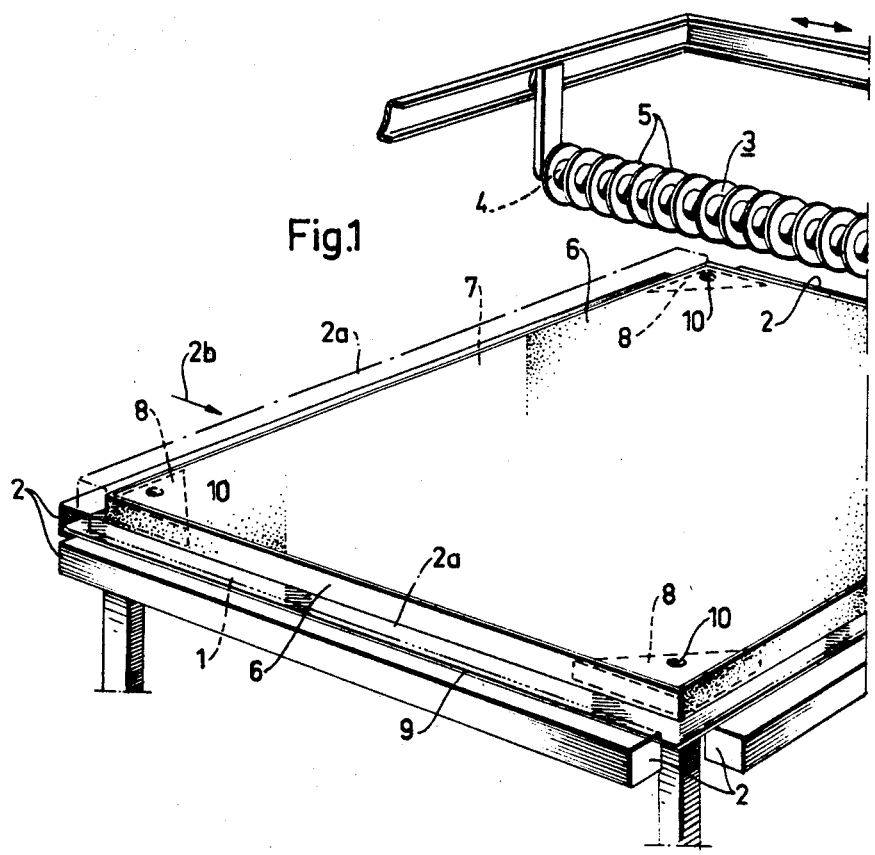
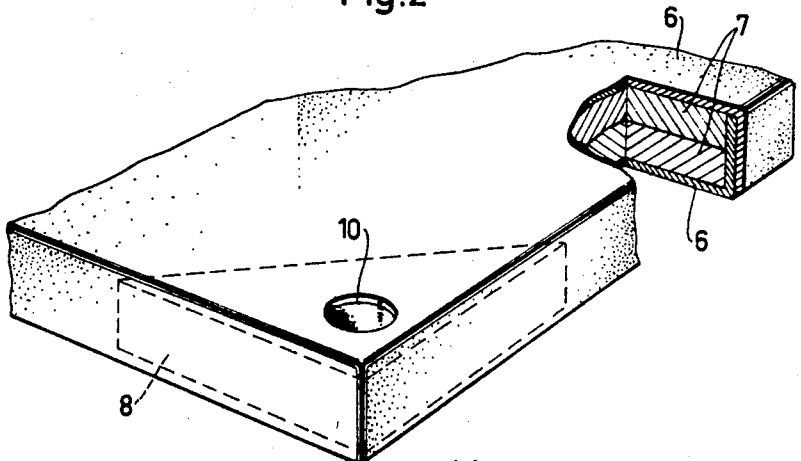
KARL OSKAR WIKHOLM
INVENTOR.
BY
ATTORNEY.

Sept. 3, 1968 K. O. WIKHOLM 3,400,028
METHOD FOR PRODUCING LEAKPROOF CONTAINERS
Filed Dec. 21, 1965 2 Sheets-Sheet 2

KARL OSKAR WIKHOLM
INVENTOR.

BY *Albert M. Father*

ATTORNEY.

United States Patent Office 3,400,028
Patented Sept. 3, 1968

3,400,028
METHOD FOR PRODUCING LEAKPROOF CONTAINERS
Karl Oskar Wikholm, Kungstensgatan 56, Stockholm, Sweden
Filed Dec. 21, 1965, Ser. No. 515,428
Claims priority, application Sweden, Dec. 23, 1964, 15,664/64
5 Claims. (Cl. 156—64)

ABSTRACT OF THE DISCLOSURE

Rectangular or cylindrical containers are made by forming the wall elements out of wood, or other fibre material, bound by a binding medium into a firm body and coating the outer surfaces of such bodies with one or more layers of fibre reinforced plastic which are preformed as lamina to which the bodies are applied and the assembly pressed together. The interiors of the bodies are subjected to pressure different from atmospheric to test for leaks. Then the wall elements are secured together along edge faces and opposed wall surfaces by adhesive and pressure.

---

The present invention concerns the production of leakproof containers of different types, particularly large liquid tanks for example of the type used for storing oils, gasoline, etc. As a rule such containers are manufactured from iron, aluminum or other metals. This often gives rise to corrosion problems which mean that the structures become expensive both in construction costs as well as costs of transportation, maintenance and heat insulation.

The present invention concerns inter alia an improvement in these matters by consructing the container of joinable corrosion resistant units of more or less porous, and thus heat insulating, wood fiber boards or similarly shaped forms which are each composed of wood or other fiber material bound by a binding medium into a firm body, and which are each coated on their outer surfaces by one or more leakproof layers of fiber reinforced plastic, whereafter the so produced leakproof, heat insulating and fire resistant units are tested for their leakproofness by exposing their interiors to a reduced or excess gas pressure and then joining these units to form the desired container by gluing or fusing of the binding medium at the adjoining surfaces of the units while sealing the joints so formed. The invention also concerns the container thus produced which exhibits good characteristics in respect to firmness, heat insulation, fire-resistance, light weight, good weather resistance, and high resistance to moisture, water, chemicals and petroleum products. Thus one obtains liquid tight vessels and containers with double security against leaking because all surfaces are leakproof tested. A large field of use is as indoor and also above and below ground reservoirs for storing gasoline and oils. The container may have a cross section which is rectangular, polygonal, cylindrical or otherwise rounded depending on the form of the wood fiber bodies used. They may be furnished with manhole covers and pipe connections in the usual manner. Arrangements for the above mentioned leakproofness test on the separate units by partial vacuum or excess pressures are affixed at suitable locations before the units are joined together, and after the container is completed it is pressure tested in the usual manner. However it is important that each section be leakproof tested individually in the above mentioned way.

Several embodiments of the invention are shown for exemplary purposes in the accompanying drawing where:

FIG. 1 schematically shows an arrangement for producing a unit in the form of a sheet or plate for a container;

FIG. 2 shows a finished plate with a fitting for testing leakproofness;

Figure 3:
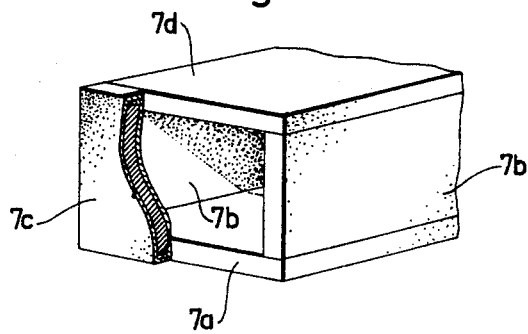
FIG. 3 shows a part of a finished rectangular container.

The arrangement shown in FIG. 1 for the production of a plate shaped unit comprises mainly a table 1 with a flat plate, for example of steel, which is held at a desired working level by means of suitable supports. The horizontal dimensions of the plate correspond to the dimensions of the finished units. Steel bars 2 are arranged along the four sides of the plate. These bars are movable by means of hydraulic, pneumatic, or other means upward to positions 2a corresponding to the thickness of the finished unit and inward as shown by arrow 2b against the edges of the unit so that the bars may be pressed with a suitably adjusted pressure against these edges.

A roller 3 is located above the table. The roller comprises a rotatable shaft 4 on which round metal washers 5 are threaded. The distances between the washers is maintained by means of spacing sleeves. The roller is horizontally movable along the table and may be caused to roll back and forth over the table at a suitable pressure. After each travel back and forth across the table the roller is lifted and moved somewhat sideways (i.e. in an axial direction).

A soft plastic or cellophane foil 9 is first laid onto the table 1. A gel coating (for example a colored polyester such as "199 Crystic," an isophthalic acid ester from the firm Scott Bader and Co., Wellingborough, England) is squirted or applied to the foil in an amount of about 300 grams/sq. meter. A hardener and accelerator, such as 4% cyclohexanone peroxide or 2–4% cobaltoctoate, is added so that the coating is quick-hardened. As soon as the hardening has begun a polyester of the isophthalic acid type is squirted on the coating in an amount of 600 grams/sq. meter. A fiber glass mat with a silane finish and a binding agent of polyester powder is laid down in this polyester. The weight of the mat may be for example 300 grams/sq. meter. Additional polyester of about 300 grams/sq. meter may suitably be squirted on the mat.

After this the surface of the mat is acted upon by roller 3 which is repeatedly rolled over this surface until all air has been pressed out of laminate formed by the mat (a mixture of glass fiber and polyester). The procedure is repeated if necessary by further applications of 600 grams/sq. meter of polyester, 300 grams/sq. meter of glass fiber matting and 300 grams/sq. meter of polyester followed by a rolling operation.

After this, one or more wood fiber boards 7 are layed onto the thus formed lamina 6 so that they cover the whole lamina. The four corners of the board thus obtained are furnished with a tip of for example 0.8 mm. epoxy resin coated stainless sheet metal 8 as shown in FIG. 2. A suitable pressure is applied to the board so that the polyester penetrates into the under surface of the board. After this, bars 2 are moved upward and inward to position 2a so that the plastic foil carrying the lamina 6 is bent up toward the edges of wood fiber board 7 and pressed against this. Thermostat controlled heating means in the table top and bars 2 is then switched on so that a temperature of 30°–40° C. is obtained and the lamina is quick-hardened. After this occurs bars 2 are returned to their initial positions, the wood fiber board with lamina 6 is lifted away, and the plastic foil 9 is removed from table 1. Plastic foil 9 is then again placed on table 1 and squirted with about 300 grams/sq. meter of gel coating (199 Crystic polyester) which is allowed to quick-harden. When hardening begins, about 900 grams/sq. meter of polyester is squirted on the gel coating.

A 450 grams/sq. meter glass fiber mat of the above mentioned quality is laid in this polyester and about 450 grams/sq. meter of polyester is squirted on top of the glass fiber mat.

Roller 3 is then used to remove the air from the lamina. The previously coated wood fiber board is then laid with its uncoated side down onto the unhardened lamina. The earlier described procedure with bars 2 and heating is repeated. When lamina 6 is hardened and plastic foil 9 is removed, plate 7 is ready for leakproof testing. This is accomplished by subjecting the interior of the plate to a vacuum (or excess pressure) that is, a pressure different from the atmospheric pressure via closable hole 10 located in corner fitting 8. Due to the porosity of the wood fiber board the reduced or excess pressure extends to all parts of the board and leakiness may be easily observed by a pressure gauge. Hole 10 in fitting 8 is located so that it is accessible from the outside also after the tank is completed so that connection of a test means for leakage testing is possible. The plates are produced in such dimensions that they may be used as bottoms, tops, sides and ends for tanks. All the joining surfaces of the plates are smoothed to obtain flat surfaces before the plates are joined. Bottom plate 7a (FIG. 3) is placed in an angle-iron frame whose vertical flanges extend 20 mm. above the top surface of this bottom plate. Along the edges of the plate there is applied an adhesive streak of solvent-free thixotropic epoxy resin, for example bisphenol epichlorohydrine condensate with a hardener containing at least two amino groups such as polyamide and polyamine. Long sides 7b are subsequently mounted in their places on the adhesive streak. The sides are held in position by means of a fixture. Thereafter an adhesive streak is spread on the edges of the long sides which face end plates 7c. The end plates are then set in place and with the aid of a fixture these plates are pressed against the long sides and simultaneously all sides are pressed against bottom 7a. The epoxy resin driven out is scraped off. When the epoxy resin hardens, the joints are sealed internally with epoxy impregnated glass fabric strips.

A hole is sawed out of the roof plate and a manhole cover frame may be placed in this hole. The frame is glued with epoxy resin against the upper side of the roof. Sealing is carried out with epoxy impregnated glass fabric strips about 60 mm. wide. The manhole cover frame is furnished with the necessary bolts and also a fixed section and an openable section. Sockets for pipe connections, level gauge and the like are installed in the fixed portion.

On the upper edges of sides 7b and ends 7c an adhesive streak is applied and thereafter roof plate 7d is installed and pressed against the sides. The epoxy resin driven out is scraped off. When the epoxy resin hardens the tank is leakproof tested.

Figure 4:
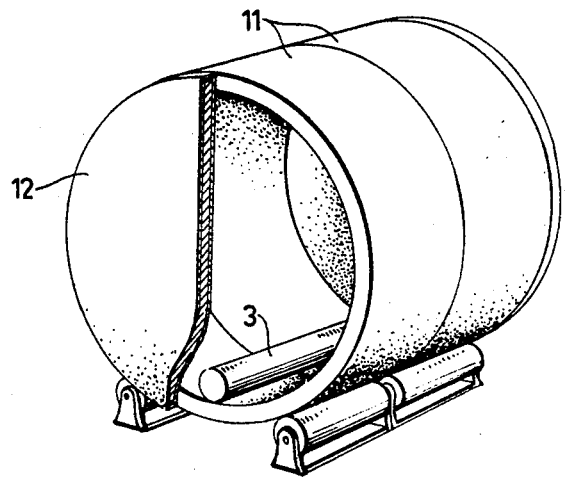
FIG. 4 shows a unit with a circular container.

FIG. 4 shows a unit for a round or circular container or tank with flat ends particularly for storing petroleum products. In this case the tank is composed of a number of casing elements 11 and also two flat ends 12. The diameter of the ends and casing elements as well as the number of casing elements determines the volume of the tank. The ends and casing elements are built up in the same manner as the wood fiber boards described above and also subsequently coated with reinforced plastic. The table shown in FIG. 1 comprises in this case a box shaped disk the diameter of which corresponds to the diameter of the finished end 12. The disk can be filled by inlet and outflow means with water or other fluid at the desired temperature. The disk is encircled by a fixture comprising two movable U-shaped parts with a rubber hose mounted therein.

The hose, by means of inlets and outlets, may be filled with hot water of the desired temperature and pressure. A round wooden fiber board is laid on the disk, the fixture is moved toward its inner position and the rubber hose is filled with water at 30°–40° C. so that the inside of the hose presses the lamina against the edge of the board while the heat from the water accelerates the hardening. At the same time when the water is introduced into the hose, the table is filled with hot water of the same temperature. In this manner the hardening of the lamina is speeded. When the lamina hardens the coated wooden fiber board is taken from the table, the plastic or cellophane foil is removed, and the procedure repeated on the end plate's other side, i.e. the side facing the casing element. The lamina on the end's inside extends out to the edge of the board around the whole circumference except a certain edge part which lacks the lamina. At the edges there is received in this way a desired air connection in the tank between the two lamina shells.

The casing elements are formed of rings or tubular elements of wood fiber bodies which are rotatably carried by rollers. A 300 grams/sq. meter glass fiber of the previously stated quality is fastened on the inside of the cylinder. The fastening of the mat should occur at the lowest point of the cylinder which is possible since the cylinder slowly turns on the rollers. The mat can have a width of up to about 20 mm. from the edge of the cylinder. While the cylinder continues to turn slowly, "Crystic 199" including hardener and accelerator is applied in a layer of 900 grams/sq. meter according to the above description.

A roller of the type shown in FIG. 1 with a length corresponding to the length of the cylinder is then placed in the cylinder in the lowest position of said cylinder. When the cylinder rotates the roller will roll along the inside of the cylinder so as to force air out of the lamina. The weight of the roller is chosen so as to obtain correct pressure. When the air is forced out of the lamina, about 600 grams/sq. meter of "Crystic 199" is applied and thereafter an additional 300 grams/sq. meter glass fiber mat is applied. 300 grms/sq. meter of "Crystic 199" is spread on the mat and air is forced out of the lamina by means of a roller similar to that shown in FIG. 1. When hardening of the lamina begins a gel coating based on "Crystic 199" is applied to about 20 mm. from the lamina's edge, i.e. about 40 mm. from the cylinder's edge.

External coating is carried out by forming a lamina as above on a flat table the width of which corresponds to the width of the casing element and the length of which corresponds to the circumference of the casing element plus about 40 mm. The lamina is composed of a gel coating plus two 300 grams/sq. meter glass fiber mats and a total of about 1800 grams/sq. meter of "Crystic 199."

When the lamina is ready (that is after all the air has been forced out and before the polyester has gelled) it is rolled onto the cylinder. During this rolling on of the lamina, the cylinder is set up on a rotating mandrel. Splicing of the lamina is effected by removing the cellophane foil at the end of the lamina which is first applied to the cylinder and allowing the opposite end to overlap about 40 mm. This is possible since the gel coating has only stiffened but not final hardened so that the cellophane foil can be removed, and the polyester in the lamina fastens to the gel coating.

One casing element in each tank should be furnished with a manhole as well as pipe fittings. Assembly of the tank is carried out by placing the end plate with its inside upward and squirting a streak of solvent-free epoxy resin on the part of the inside's edge which is covered by the lamina. A casing element is placed against the end plate and pressed against it. The epoxy resin forced out is scraped off. When the epoxy resin hardens, the casing element with the attached end plate is placed on rollers. The assembler works on his knees in the casing element and covers the joint between the casing and the end plate with an about 100 mm. wide lamina strip of two 300 grams/sq. meter glass fiber mats and 1800 grams/sq. meter of "Crystic 199." The lamina is always applied at the lowest point in the cylinder. The turning of the casing element occurs since the assembler successively moves his knees sideways. Air removal is done by hand. When the lamina begins to harden it is painted with a gel coating of about 300 grams/sq. meter. In essentially the same manner one after another of the casing elements are glued together. In order to coat the tank's last joint internally the assembler must enter and leave the tank by way of the manhole.

The joints in the outer lamina are coated in the same way as the internal lamina. The tank is placed on rolls which do not cover the joints. Air may be removed by hand or by mechanical means.

The invention may be modified in many ways without departing from the scope of the invention. The cited numbers and materials are merely stated as examples and should not be regarded as limiting the invention.

What I claim is:

1. A method to produce a leakproof container characterized in that a number of joinable units of porous shaped elements of wood fiber such as boards which are composed of fiber material such as wooden fibers bound by a binding medium into a firm body, are each on their outer surfaces coated with and enclosed by one or more leakproof layers of fiber reinforced plastic, whereafter the units thus produced are tested for their leakproofness by exposing their interior to a pressure different from atmospheric pressure and then joining these units to form the desired container by gluing the binding medium at the adjoining surfaces of the units while sealing the joints thus formed.

2. The method according to claim 1 characterized in that the fiber reinforced plastic is first affixed on one side of the wood fiber element and then on the other side thereof while folding over the plastic material at the edges of the element.

3. The method according to claim 1 characterized in that the fiber reinforced plastic is affixed so that at least one edge zone is left free.

4. The method according to claim 1 for producing a container with a round cross section characterized in that the shell of said container is produced from at least one ring shaped wood fiber element which externally and internally is furnished with at least one leakproof layer of fiber reinforced plastic, said shell being tightly joined to disk shaped ends which are formed from wood fiber boards enclosed by fiber reinforced plastic.

5. The method according to claim 1 for producing a container characterized in that at suitable locations the wood fiber elements are furnished with at least one means for connecting the interior of the wood fiber elements to a vacuum source or a gas pressure source.

References Cited

UNITED STATES PATENTS

| | | | |
|---|---|---|---|
| 1,942,162 | 1/1934 | Campbell | 161—407 X |
| 2,385,146 | 9/1945 | MacDonald | 220—9 X |
| 2,905,580 | 9/1959 | Kreier | 156—265 |
| 3,007,597 | 11/1961 | Morrison | 220—11 |
| 3,052,019 | 9/1962 | Strasser | 156—286 X |
| 3,131,104 | 4/1964 | Korn | 156—73 |
| 3,298,150 | 1/1967 | Ahlquist | 156—71 |

EARL M. BERGERT, *Primary Examiner.*

R. KILLWORTH, *Assistant Examiner.*